No. 759,918. PATENTED MAY 17, 1904.
J. ROACH & J. JACKSON.
PLOW.
APPLICATION FILED SEPT. 9, 1903.
NO MODEL.

Witnesses:
Jas. E. Hutchinson.
H. E. Montague.

Inventors:
John Roach and James Jackson,
By Baker Milans
Attorney

No. 759,918. Patented May 17, 1904.

UNITED STATES PATENT OFFICE.

JOHN ROACH AND JAMES JACKSON, OF ASSUMPTION, ILLINOIS.

PLOW.

SPECIFICATION forming part of Letters Patent No. 759,918, dated May 17, 1904.

Application filed September 9, 1903. Serial No. 172,457. (No model.)

*To all whom it may concern:*

Be it known that we, JOHN ROACH and JAMES JACKSON, citizens of the United States, residing at Assumption, in the county of Christian and State of Illinois, have invented certain new and useful Improvements in Plows, of which the following is a specification, reference being had therein to the accompanying drawings.

This invention relates to certain improvements in plows, and has for its object the provision of means, preferably associated with the moldboard of a plow, designed to greatly facilitate the pulverization of the soil, as well as to assist the movement of the plow through the ground being operated upon.

With the above-named object in view the invention comprehends a plow provided with a series of rotatable cutters or disks mounted upon the moldboard thereof so as to project outwardly beyond the surface of the moldboard and instrumentalities for effecting an adjustment of said disks or cutters to regulate the extent of their protrusion.

The novel details in the construction and arrangement of the several parts of the plow will be apparent from the detail description hereinafter, when read in connection with the accompanying drawings, forming a part hereof, and wherein a convenient embodiment of the invention is illustrated.

Figure 1:
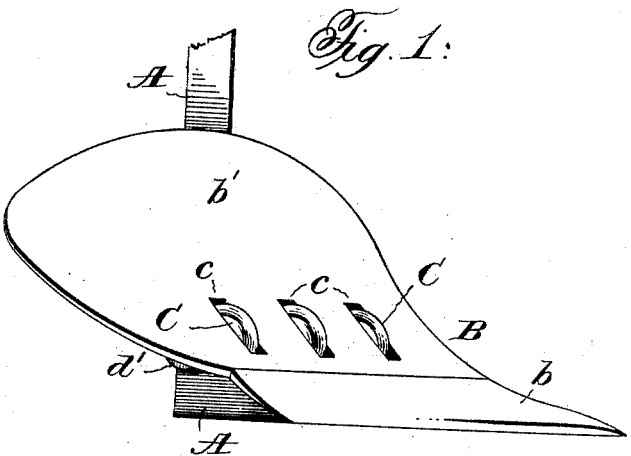
Figure 2:
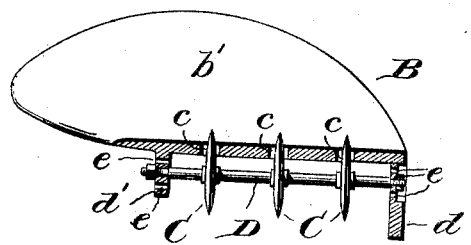
Figure 3:
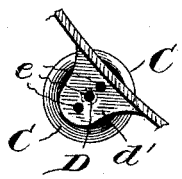

In the drawings, Figure 1 is a side elevation of the plow. Fig. 2 is a transverse sectional view, and Fig. 3 is a detail edge view.

Referring more specifically to the drawings, A designates a standard of any usual or preferred type, and B the plow carried thereby, $b$ being the plowshare, and $b'$ the moldboard. Near the forward edge of the moldboard adjacent to its line of juncture with the plowshare we provide a transversely-disposed series of slots $c$, the number of said slots being wholly immaterial and dependent upon the size of the plow or the work to be done thereby. Adapted to protrude through the slots just mentioned, one in each slot, are a series of rotary disks C, the same being loosely mounted upon a shaft D, whereby the disks or cutters, owing to their frictional engagement with the soil, will rotate, and thereby lessen the resistance to the movement of the plow through the ground, as well as effectually cut up or pulverize the soil displaced by the plow. In order to rotatably support the disks or cutters C and to adjust the protrusion of the same through the slots $c$, any convenient or preferred means may be employed, that shown being simply for the purpose of illustrating the idea involved. As shown, the shaft D, which carries the disks, is supported at its ends in perforated ears or brackets $d\,d'$, carried, respectively, by the standard A and the moldboard, said ears being cast with their supporting members or otherwise secured thereto. Each ear has a series of apertures $e$, the corresponding apertures of both ears being in alinement, whereby the shaft D may be adjusted forwardly or rearwardly, as found expedient under particular conditions, and the adjustment of the disks or cutters C thereby effected, the shaft being held in position by nuts E or other devices engaging the ends thereof.

Slight changes in the construction herein disclosed may obviously be made without in the least departing from the spirit of the invention.

Having thus described the invention, what is claimed as new, and desired to be secured by Letters Patent, is—

1. In a plow, the combination of a moldboard, having a slot therein, a rotatable disk projecting through said slot, and means for adjusting the extent of protrusion of said disk through said slot.

2. In a plow, the combination of a moldboard, having slots therein, rotatable disks projecting through said slots, and means for adjusting the extent of protrusion of said disks through said slots.

3. In a plow, the combination of a moldboard, having slots therein, rotatable disks projecting through said slots, and means for simultaneously adjusting the extent of protrusion of said disks through said slots.

In testimony whereof we affix our signatures in presence of two witnesses.

JOHN ROACH.
JAMES JACKSON.

Witnesses:
F. R. GOODE,
E. S. PARKS.